US011556585B2

(12) United States Patent
Koo et al.

(10) Patent No.: US 11,556,585 B2
(45) Date of Patent: Jan. 17, 2023

(54) ELECTRONIC APPARATUS FOR DYNAMIC NOTE MATCHING AND OPERATING METHOD OF THE SAME

(71) Applicant: NAVER CORPORATION, Gyeonggi-do (KR)

(72) Inventors: Inyong Koo, Seongnam-si (KR); Je Kyun Park, Seongnam-si (KR); Jisu Jeon, Seongnam-si (KR); Jongeun Park, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 288 days.

(21) Appl. No.: 16/897,682

(22) Filed: Jun. 10, 2020

(65) Prior Publication Data

US 2020/0394214 A1 Dec. 17, 2020

(30) Foreign Application Priority Data

Jun. 11, 2019 (KR) .......................... 10-2019-0068842

(51) Int. Cl.
*G10L 15/12* (2006.01)
*G06F 16/632* (2019.01)
(Continued)

(52) U.S. Cl.
CPC ............ *G06F 16/634* (2019.01); *G06F 16/68* (2019.01); *G06F 17/16* (2013.01); *G10L 15/285* (2013.01)

(58) Field of Classification Search
CPC ......... G10L 15/12; G10L 15/00; G10L 15/02; G10L 15/06; G10L 15/063; G10L 15/065;
(Continued)

(56) References Cited

U.S. PATENT DOCUMENTS

2013/0226957 A1 8/2013 Ellis et al.
2013/0318348 A1 11/2013 Lebron et al.
(Continued)

FOREIGN PATENT DOCUMENTS

CN 103988256 A 8/2014
CN 109409496 A 3/2019
(Continued)

OTHER PUBLICATIONS

CA Office Action for Taiwanese Application No. 109119332 dated Apr. 9, 2021.
(Continued)

*Primary Examiner* — Qi Han
(74) *Attorney, Agent, or Firm* — Harness, Dickey & Pierce, P.L.C.

(57) ABSTRACT

Disclosed are an electronic apparatus for dynamic note matching (DNM) and an operating method thereof, the method including acquiring a first section sequence by reducing a first sequence extracted from an input signal based on at least one first section in which the respective values are successively arranged; acquiring a second section sequence reduced from a pre-stored second sequence based on at least one second section in which the respective values are successively arranged; and calculating a similarity between the first section sequence and the second section sequence.

18 Claims, 14 Drawing Sheets

(51) Int. Cl.
*G10L 15/28* (2013.01)
*G06F 17/16* (2006.01)
*G06F 16/68* (2019.01)

(58) Field of Classification Search
CPC ......... G10L 15/08; G10L 15/10; G10L 15/24;
G10L 15/30; G10L 19/00; G10L 19/02;
G10L 19/05022; G10L 19/032; G10L
19/16; G10L 19/167; G10L 19/22; G10L
19/24; G10L 19/022; G10L 19/025
USPC ....... 704/239, 206, 216, 221, 222, 236, 237,
704/238, 241, 243, 250, 254
See application file for complete search history.

(56) References Cited

U.S. PATENT DOCUMENTS

2014/0195474 A1* 7/2014 Anguera ................ G06N 5/047
706/48
2017/0103672 A1* 4/2017 Dey ....................... G06V 40/23
2020/0152179 A1* 5/2020 van Hout ................. G06N 3/08

FOREIGN PATENT DOCUMENTS

| JP | S64-021499 A | 1/1989 |
| JP | H07-508360 A | 9/1995 |
| JP | H09-138691 A | 5/1997 |
| JP | 2003-242510 A | 8/2003 |
| JP | 2008-102482 A | 5/2008 |
| JP | 2013-117688 A | 6/2013 |
| JP | 2014-142566 A | 8/2014 |
| JP | 2015-031927 A | 2/2015 |
| TW | 201624320 A | 7/2016 |

OTHER PUBLICATIONS

Office Action dated Apr. 6, 2021 issued in corresponding Japanese Patent Application No. 2020-084952.

* cited by examiner

ELECTRONIC APPARATUS FOR DYNAMIC NOTE MATCHING AND OPERATING METHOD OF THE SAME

This U.S. non-provisional application and claims the benefit of priority under 35 U.S.C. § 365(c) to Korean Patent Application No. 10-2019-0068842, filed Jun. 11, 2019, the entire contents of which are incorporated herein by reference in their entirety.

TECHNICAL FIELD

One or more example embodiments relate to an electronic apparatus for dynamic note matching (DNM) and an operating method of the electronic apparatus.

RELATED ART

In current communication environments, a query by humming (QbH) service is being provided. To provide the QbH service, a server stores information associated with a large amount of audio files. A client transmits, to the server, an audio signal corresponding to a melody the client desires to retrieve and the server feeds back information about an audio file most similar to the audio signal to the client. To this end, the server needs to compare the audio signal to each of a large amount of audio files. Accordingly, a high computational amount is required for the server, which may lead to reducing an operation speed of the server.

SUMMARY

Example embodiments may provide an electronic apparatus and an operating method of the electronic apparatus that may reduce a computational amount required to provide a service.

Example embodiments may provide an electronic apparatus and an operating method of the electronic apparatus that may reduce a computational amount required to compare an audio signal to a large amount of audio files.

According to an aspect of an example embodiment, there is provided an operating method of an electronic apparatus for dynamic note matching (DNM), the method including acquiring a first section sequence by reducing a first sequence extracted from an input signal based on at least one first section in which the respective values are successively arranged; acquiring a second section sequence reduced from a pre-stored second sequence based on at least one second section in which the respective values are successively arranged; and calculating a similarity between the first section sequence and the second section sequence through the DNM.

According to an aspect of an example embodiment, there is provided an electronic apparatus for DNM including a processor configured to extract a first sequence from an input signal; and a memory configured to connect to the processor and to store at least one second sequence.

The processor is configured to acquire a first section sequence by reducing the first sequence based on at least one first section in which the respective values are successively arranged, acquire a second section sequence reduced from a pre-stored second sequence based on at least one second section in which the respective values are successively arranged, and calculate a similarity between the first section sequence and the second section sequence through the DNM.

According to an aspect of an example embodiment, there is provided a non-transitory computer-readable storage medium storing instructions that, when executed by a processor, cause the processor to perform an operating method of an electronic apparatus for DNM, the method including acquiring a first section sequence by reducing a first sequence extracted from an input signal based on at least one first section in which the respective values are successively arranged; acquiring a second section sequence reduced from a pre-stored second sequence based on at least one second section in which the respective values are successively arranged; and calculating a similarity between the first section sequence and the second section sequence through the DNM.

According to at least some example embodiments, an electronic apparatus may each of an input signal and pre-stored data and may compare the reduced input signal and pre-stored data, which may lead to reducing a computational amount required for the electronic apparatus. Here, the electronic apparatus may generate a cost matrix based on a first section sequence reduced from the input signal and a second section sequence reduced from the pre-stored data and may detect a warping path from the cost matrix through DNM. Through this, the electronic apparatus may use dynamic programming with information reduced from the input signal and the pre-stored data. Accordingly, the electronic apparatus may acquire a desired result with the reduced computational amount, which may lead to improving the operational efficiency of the electronic apparatus and a quality of service (QoS) provided through the electronic apparatus.

Further areas of applicability will become apparent from the description provided herein. The description and specific examples in this summary are intended for purposes of illustration only and are not intended to limit the scope of the present disclosure.

DETAILED DESCRIPTION

Figure 1:
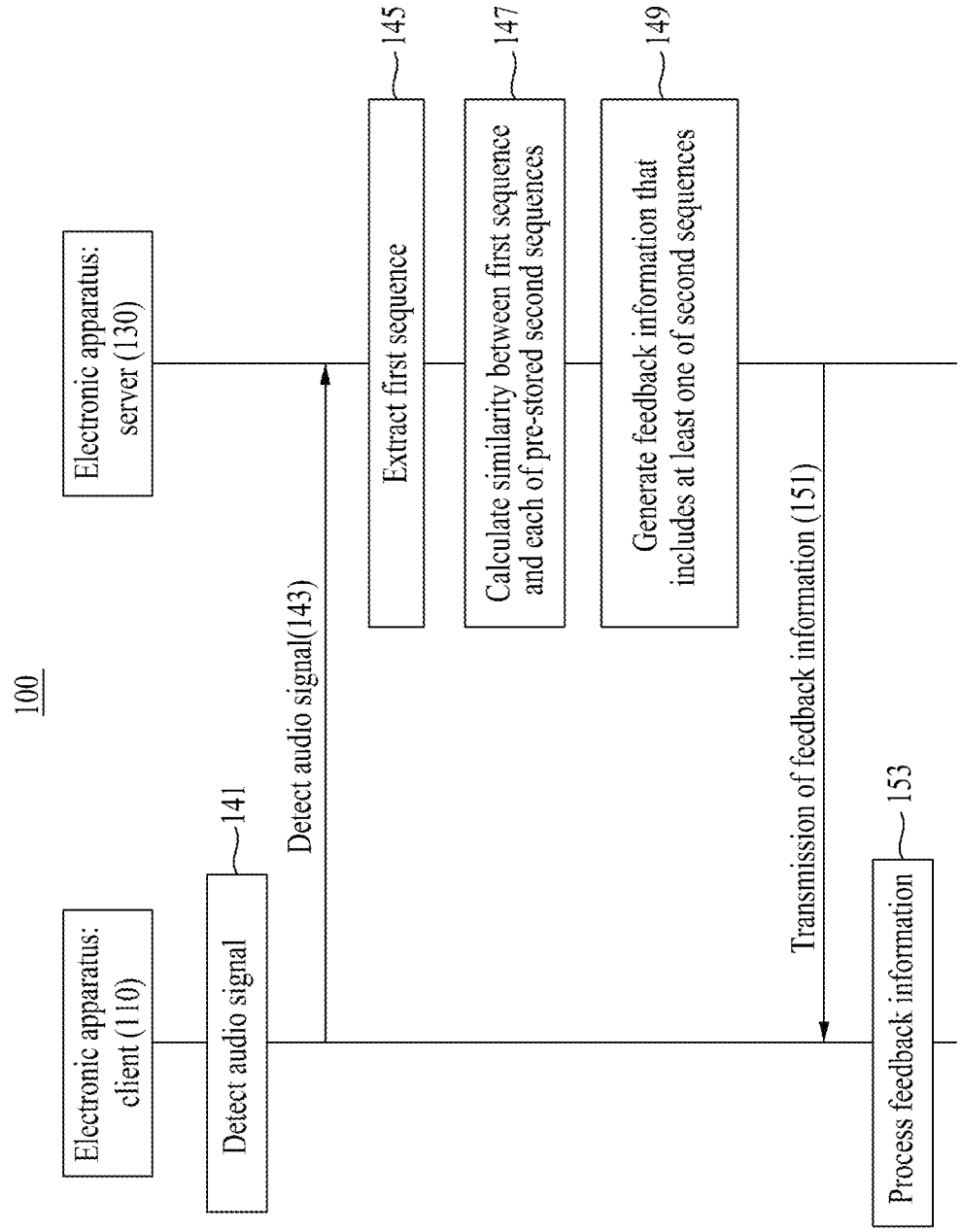
FIG. 1 illustrates an example of a system and a signal flow of the system according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of a system 100 and a signal flow of the system 100 according to at least one example embodiment.

Referring to FIG. 1, the system 100 may include a plurality of electronic apparatuses. The electronic apparatuses may communicate with each other over a network (not shown). The electronic apparatuses may include, for example, at least one client 110 and at least one server 130. For example, the client 110 may include at least one of a portable communication apparatus, a computer apparatus, a portable multimedia apparatus, a portable medical device, a camera, a wearable device, and a home electronic appliance. However, it is provided as an example only. The server 130 may provide a variety of services to the client 110. To this end, the server 130 may include a database (DB) to be used for providing a service. According to an example embodiment, the server 130 may provide a query by humming (QbH) service to the client 110. To this end, the server 130 may store at least one of a plurality of audio files and meta information about the audio files.

Referring to FIG. 1, in operation 141, the client 110 may detect an audio signal. In response to a request from a user, the client 110 may collect an audio signal during a specific time interval. The audio signal may be related to a melody the user desires to retrieve. For example, the audio signal may include at least one of voice of the user and music being played back in an external environment. In operation 143, the client 110 may transmit the audio signal to the server 130.

When the audio signal is received from the client 110 in operation 143, the server 130 may extract a first sequence q from the audio signal in operation 145. The first sequence q may include number vectors. To this end, the server 130 may extract the number vectors from the audio signal and may acquire the first sequence q from the number vectors. Here, the first sequence q may have a specific length a and may be in a structure in which the respective values, that is, number vectors are successively arranged. For example, subsequent Dynamic Time Warping (sDTW) scheme may be used to extract the first sequence q from the audio signal.

In operation 147, the server 130 may calculate a similarity between the first sequence q and each of pre-stored second sequences s. Here, the server 130 may store the second sequences s of the audio files with at least one of the audio files and meta information about the audio files. Here, each of the second sequences s may be extracted from at least a partial area of one of the audio files and may include number vectors. To this end, the server 130 may extract the number vectors from the at least a partial area of one of the audio files and may acquire at least one of the second sequences s from the number vectors. Here, each of the second sequences s may have a specific length b and may be in a structure in which the respective values, that is, number vectors are successively arranged. The server 130 may calculate the similarity between the first sequence q and each of the second sequences s through dynamic note matching (DNM). The server 130 may reduce the first sequence q and the second sequences s and may calculate the similarities based on the reduced first sequence q and second sequences s.

In operation 149, the server 130 may generate feedback information that includes at least one of the second sequences s. The server 130 may select at least one of the second sequences s based on the similarities. For example, the server 130 may detect a relatively high or, alternatively, maximum similarity from among the similarities and may select the second sequence s corresponding to the detected relatively high or, alternatively maximum similarity. As another example, the server 130 may detect at least one similarity exceeding a predetermined (or, alternatively, desired) threshold from among the similarities and may select the second sequence s corresponding thereto. The server 130 may generate feedback information that include meta information about an audio file associated with at least one of the second sequences s. In operation 151, the server 130 may transmit the feedback information to the client 110.

When the feedback information is received from the server 130 in operation 151, the client 110 may process the feedback information in operation 153. For example, the client 110 may output the feedback information. As another example, the client 110 may transmit the feedback information to another electronic apparatus (not shown).

Figure 2:
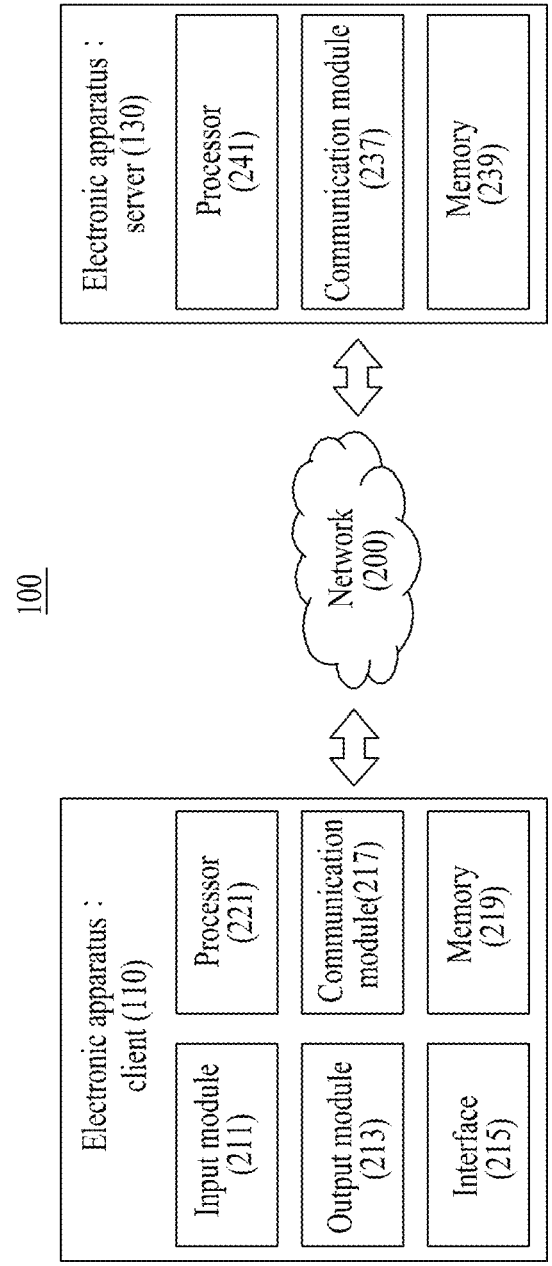
FIG. 2 is a diagram illustrating an example of an electronic apparatus according to at least one example embodiment.

FIG. 2 is a diagram illustrating an example of an electronic apparatus according to at least one example embodiment.

Referring to FIG. 2, the system 100 may include a plurality of electronic apparatuses. The electronic apparatuses may communicate with each other over a network 200. For example, the network 200 may include at least one of a far field wireless communication network and a near field wireless communication network. The electronic apparatuses may include at least one client 110 and at least one server 130.

Referring to FIG. 2, the client 110 may include at least one of an input module 211, an output module 213, an interface 215, a communication module 217, a memory 219, and a processor 221. Depending on example embodiments, at least one of components of the client 110 may be omitted or at least one component may be added to the client 110.

The input module 211 may input a signal from an outside of the client 110 or an instruction for at least one component of the client 110. Here, the signal may include at least one of an audio signal and a video signal. According to at least some example embodiments, the input module 211 may be or include a circuit or circuitry configured to perform the operations described in the present disclosure as being performed by the input module 211. For example, the input module 211 may include at least one of a microphone, a camera module, a mouse, a keyboard, and a variety of sensors.

The output module 213 may provide information to the outside of the client 110. According to at least some example embodiments, the output module 213 may be or include a circuit or circuitry configured to perform the operations described in the present disclosure as being performed by the output module 213. The output module 213 may include at least one of a display module (e.g., a display) configured to visually provide information and an audio module (e.g., speakers) configured to auditorily provide information. For example, the display module may include at least one of a display, a hologram device, and a projector. Depending on example embodiments, the display module may couple with at least one sensor configured to sense a touch.

The interface 215 may directly or wirelessly connect the client 110 to another electronic apparatus (not shown). According to at least some example embodiments, the interface 215 may be or include a circuit or circuitry configured to perform the operations described in the present disclosure as being performed by the interface 215. For example, the interface 215 may include a connector capable of physically connecting to the other electronic apparatus. For example, the interface 215 may include at least one of a high definition multimedia interface (HDMI), a universal serial bus (USB) interface, a secure digital (SD) card interface, and an audio interface.

The communication module 217 may communicate with an external apparatus at the client 110. The communication module 217 may establish a communication channel between the client 110 and the external apparatus and may communicate with the external apparatus through the communication channel. According to at least some example embodiments, the communication module 217 may be or include a circuit or circuitry configured to perform the operations described in the present disclosure as being performed by the communication module 217. The communication module 217 may include at least one of a wired communication module and a wireless communication module. For example, the wireless communication module may communicate with the external apparatus over the network 200.

The memory 219 may store a variety of data used by at least one component of the client 110. For example, the memory 219 may include at least one of a volatile memory and a non-volatile memory. Data may include a program or input data or output data related thereto.

The processor 221 may control at least one component of the client 110 and may perform data processing or operation by executing the program of the memory 219. The processor 221 may detect an audio signal through the input module 211 or the interface 215. In response to a request from the user input through the input module 211, the processor 221 may collect an audio signal during a specific time interval. The audio signal may be related to a melody the user desires to retrieve. For example, the audio signal may include at least one of voice of the user and music being played back in an external environment. The processor 221 may transmit the audio signal to the server 130 through the communication module 217. The processor 221 may receive feedback information corresponding to the audio signal from the server 130 through the communication module 217 and may process the feedback information. For example, the processor 221 may output the feedback information through the output module 213. As another example, the processor 213 may transmit the feedback information to another electronic apparatus (not shown) through the interface 215.

According to at least some example embodiments, the processor 221 may be processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

Referring to FIG. 2, the server 130 may include at least one of a communication module 237, a memory 239, and a processor 241. Depending on example embodiments, at least one of the components of the server 130 may be omitted, or at least one another component may be added to the server 130.

The communication module 237 may communicate with an external apparatus at the server 130. The communication module 237 may establish a communication channel between the server 130 and the external apparatus and may communicate with the external apparatus through the communication channel. The communication module 237 may include at least one of a wired communication module and a wireless communication module. For example, the wireless communication module may communicate with the external apparatus over the network 200. According to at least some example embodiments, the communications module 237 may be or include a circuit or circuitry configured to perform the operations described in the present disclosure as being performed by the communication module 237.

The memory 239 may store a variety of data used by at least one component of the server 130. For example, the memory 239 may include at least one of a volatile memory and a non-volatile memory. Data may include a program or input data or output data related thereto. The memory 239 may include a database to be used for providing a service to the client 110. The database may include at least one of a plurality of audio files and meta information about the audio files.

The processor 241 may control at least one component of the server 130 and may perform data processing or operation by executing the program of the memory 239. The processor 241 may receive an audio signal from the client 110 through the communication module 237. The processor 241 may calculate a similarity between the audio signal and each of the audio files stored in the memory 239. Here, the processor 241 may calculate the similarity between the audio signal and each of the audio files through DNM. The processor 241 may feed back meta information about at least one of the audio files to the client 110 based on the similarities through the communication module 237. Here, the processor 241 may generate the feedback information that includes the meta information and may transmit the feedback information to the client 110.

According to at least some example embodiments, the processor 241 may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

According to at least some example embodiments, the processor 241 may acquire a first section sequence by extracting a first sequence q from an audio signal and by reducing the first sequence q. The first sequence q may include number vectors. To this end, the server 130 may extract the number vectors from the audio signal and may acquire the first sequence q from the number vectors. Here, the first sequence q may have a specific length a and may include at least one first section in which the respective values, that is, number vectors are successively arranged. Therefore, the processor 241 may reduce the first sequence q to the first section sequence based on the first section. Here, the first section sequence may represent a sequence for a value (A_value), that is, a number vector, and a length (A_duration) of the first section.

According to at least some example embodiments, the processor 241 may acquire second section sequences reduced from second sequences s of audio files. Here, at least one of the second sequences s and the second section sequences may be stored in the memory 239. Here, each of the second sequences s may be extracted from at least a partial area of one of the audio files and may include number vectors. Here, each of the second sequences s may have a specific length b and may include at least one second section in which the respective values, that is, number vectors are successively arranged. Each of the second section sequences may be reduced from one of the second sequences s based on the second section. Here, each of the second section sequences may represent a value (B_value), that is, a number vector, and a length (B_duration) of the second section.

According to at least some example embodiments, the processor 241 may calculate a similarity between the first section sequence and each of the second section sequences through DNM. The processor 241 may generate a cost matrix based on the first section sequence and each of the second section sequences. Here, the processor 241 may generate at least one row of the cost matrix corresponding to the first section and may generate at least one column of the cost matrix corresponding to the second section. The processor 241 may detect a warping path from the cost matrix and may calculate the similarity between the first section sequence and each of the second section sequences based on the warping path.

Figure 3:
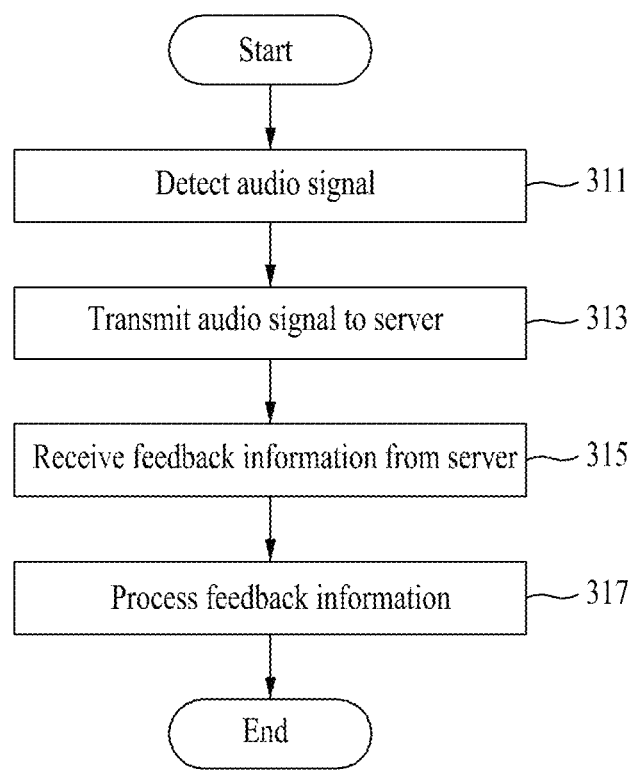
FIG. 3 is a flowchart illustrating an example of an operating method of an electronic apparatus according to at least one example embodiment.

FIG. 3 is a flowchart illustrating an example of an operating method of an electronic apparatus, for example, the client 110, according to at least one example embodiment.

Referring to FIG. 3, in operation 311, the client 110 may detect an audio signal. The processor 221 may collect an audio signal during a specific time interval in response to a request from a user input through the input module 211. The audio signal may be related to a melody the user desires to retrieve. For example, the audio signal may include at least one of voice of the user and music being played back in an external environment. In operation 313, the client 110 may transmit the audio signal to the server 130. The processor 221 may transmit the audio signal to the server 130 through the communication module 217.

In operation 315, the client 110 may receive feedback information from the server 130. The processor 221 may receive feedback information corresponding to the audio signal from the server 130 through the communication module 217. The feedback information may include meta information about at least one audio file detected in correspondence to the audio signal. In operation 317, the client 110 may process the feedback information. For example, the processor 221 may output the feedback information through the output module 213. As another example, the processor 221 may transmit the feedback information to another electronic apparatus (not shown) through the interface 215.

Figure 4:
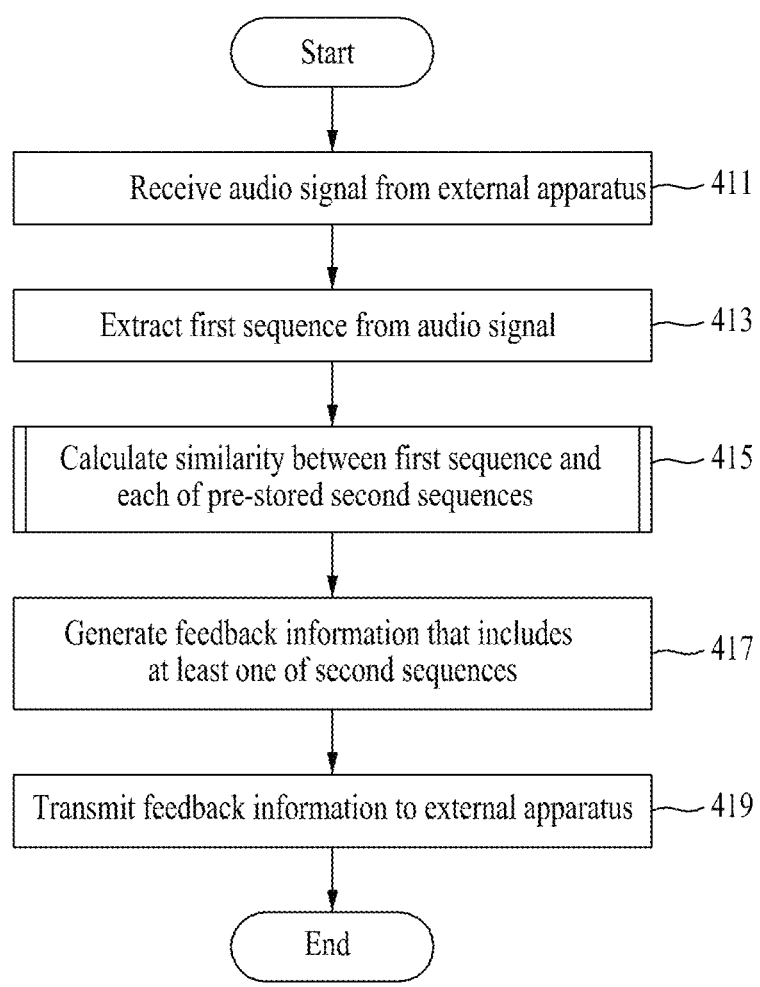
FIG. 4 is a flowchart illustrating an example of an operating method of an electronic apparatus according to at least one example embodiment.

FIG. 4 is a flowchart illustrating an example of an electronic apparatus, for example, the server 130, according to at least one example embodiment.

Referring to FIG. 4, in operation 411, the server 130 may receive an audio signal from an external apparatus, for example, the client 110. The processor 241 may receive the audio signal from the client 110 through the communication module 237. The audio signal may be related to a melody the user desires to retrieve. For example, the audio signal may include at least one of voice of the user and music being played back in an external environment.

In operation 413, the server 130 may extract a first sequence q from the audio signal. The first sequence q may include number vectors. To this end, the server 130 may extract number vectors from the audio signal and may acquire the first sequence q from the number vectors. For example, subsequent Dynamic Time Warping (sDTW) scheme may be used to extract the first sequence q from the audio signal. Here, the first sequence q may have a specific length a and may include at least one first section in which the respective values, that is, number vectors are successively arranged. For example, the first sequence q may be in a structure as represented by the following Equation 1. In this case, a length (q_length)(n) of the first sequence q may be 8.

$$q=[3,3,3,3,3,4,4,4] \quad \text{[Equation 1]}$$

In operation 415, the server 130 may calculate a similarity between the first sequence q and each of pre-stored second sequences s. Here, at least one of the second sequences s and the second section sequences may be stored in the memory 239. Here, each of the second sequences s may be extracted from at least a partial area of one of the audio files and may include number vectors. Here, each of the second sequences s may have a specific length b and may include at least one second section in which the respective values, that is, number vectors are successively arranged. For example, one of the second sequences s may be in a structure as represented by the following Equation 2. In this case, a length (s_length) (m) of one of the second sequences s may be 10. The processor 241 may calculate the similarity between the first sequence q and each of the second sequences s through DNM.

$$s=[1,1,1,1,1,1,3,3,3,3] \quad \text{[Equation 2]}$$

Figure 5:
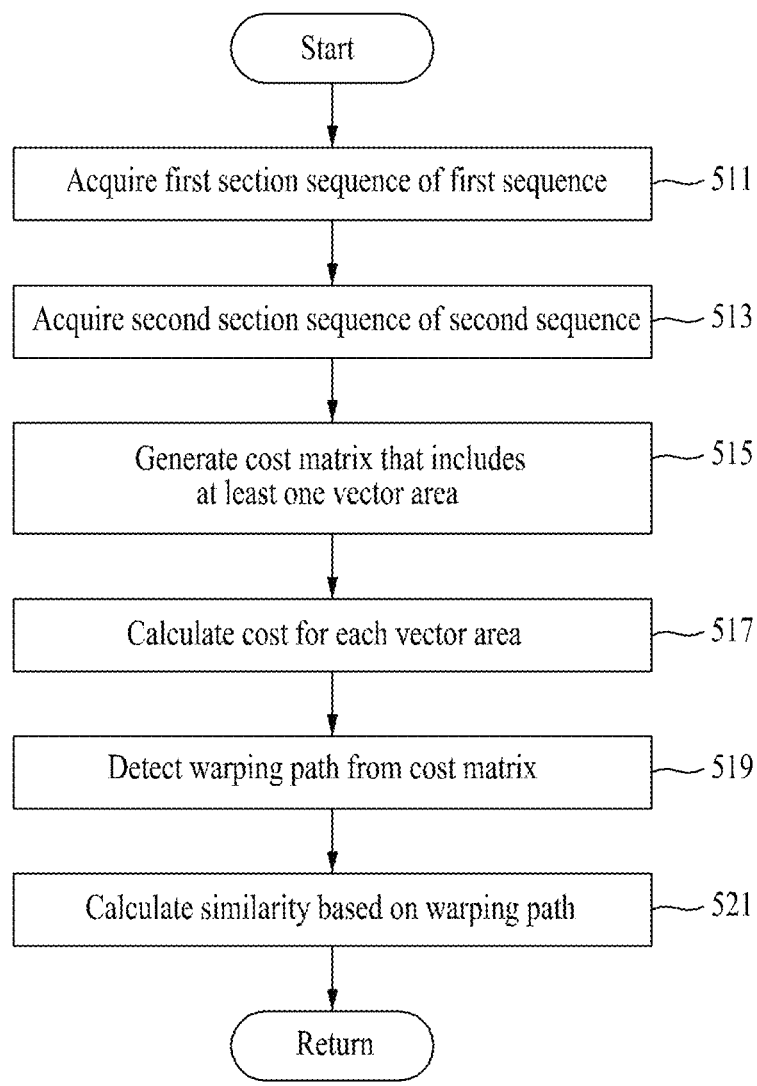
FIG. 5 is a flowchart illustrating an example of a similarity calculating operation of FIG. 4.
Figure 6:
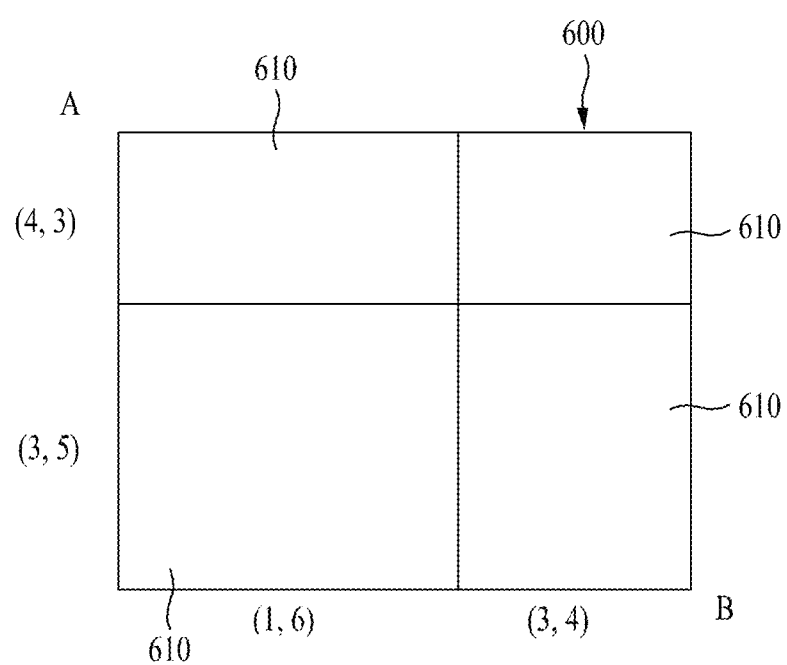
FIGS. 6, 7A, 7B, 8A, 8B, 9A, 9B, 10, 11, 12, and 13 illustrate examples of describing the similarity calculating operation of FIG. 4.
Figure 7A:
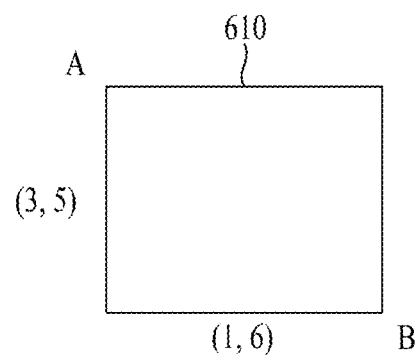
Figure 7B:
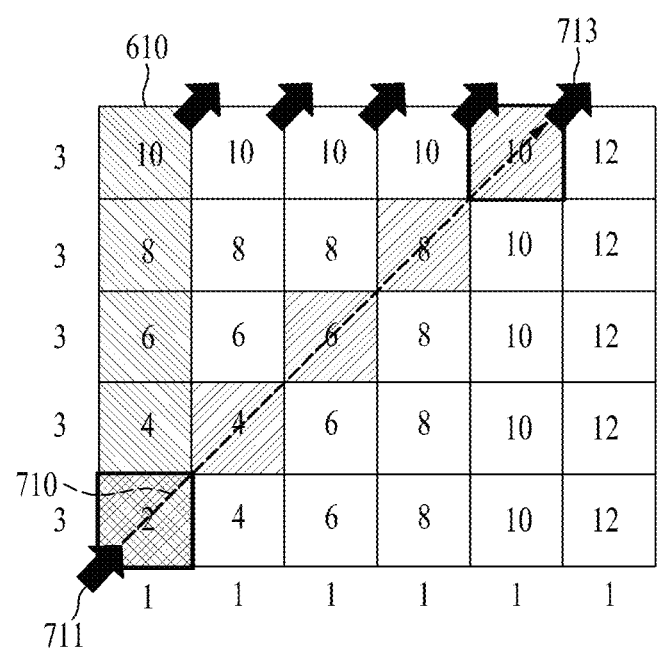
Figure 8A:
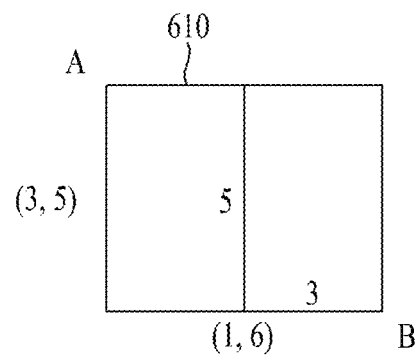
Figure 8B:
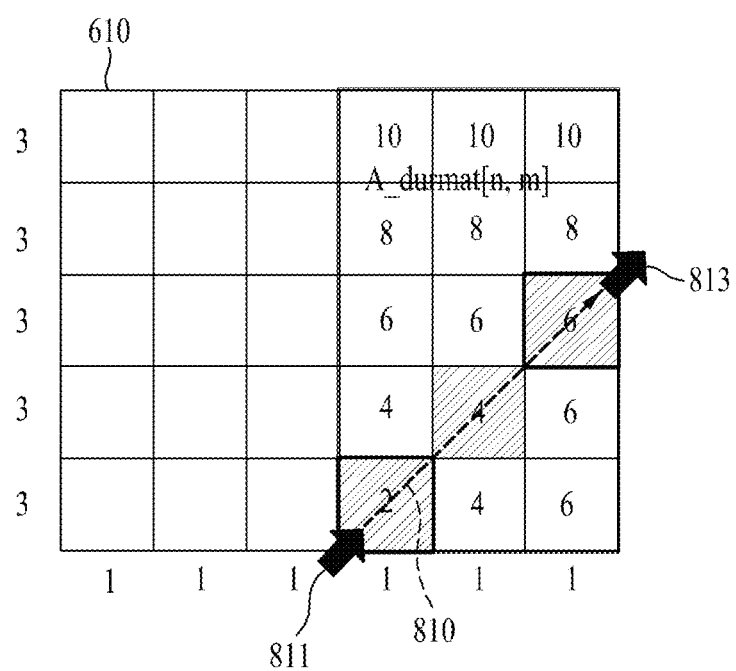

FIG. 5 is a flowchart illustrating an example of a similarity calculating operation of FIG. 4. FIGS. 6, 7A, 7B, 8A, 8B, 9A, 9B, 10, 11, 12, and 13 illustrate examples of describing the similarity calculating operation of FIG. 4.

Referring to FIG. 5, in operation 511, the server 130 may acquire a first section sequence A of a first sequence q. The processor 241 may reduce the first sequence q to the first section sequence A based on the first section of the first sequence q. Here, the first section sequence A may represent a sequence for a value (A_value), that is, a number vector, and a length (A_duration) of the first section, for example, (A_value, A_duration). For example, the first section sequence A may be reduced from the first sequence q in the structure as represented by the above Equation 1, and may have a structure as represented by the following Equation 3. In this case, a length (A_length) of the first section sequence A may be 2.

$$A=[(3,5),(4,3)] \quad \text{[Equation 3]}$$

In operation 513, the server 130 may acquire a second section sequence B of a second sequence s. The second section sequence B may be reduced from one of the second sequences s based on the second section. Here, the second section sequence B may represent a sequence for a value (B_value), that is, a number vector and a length (B_duration) of the second section, for example, (B_value, B_duration). For example, the second section sequence B may be stored in the memory 239 to correspond to one of the second sequences s. As another example, the processor 241 may acquire the second section sequence B by reducing one of the second sequences s. For example, the second section sequence B may be reduced from the second sequence s in a structure as represented by the above Equation 2 and may have a structure as represented by the following Equation 4. In this case, a length (B_length) of the second section sequence B may be 2.

$$B=[(1,6),(3,4)] \quad \text{[Equation 4]}$$

In operation 515, the server 130 may generate a cost matrix based on the first section sequence A and the second section sequence B. Referring to 6, the processor 241 may generate a cost matrix 600 for DNM. The processor 241 may generate at least one row of the cost matrix 600 corresponding to the first section of the first section sequence A and may generate at least one column of the cost matrix 600 corresponding to the second section of the second section sequence B. Here, the cost matrix 600 may include at least one vector area 610. Each vector area 610 may be generated by a single first section and a single second section. Here, each vector area 610 may be determined based on the value (A_value) and the length (A_duration) of the first section and the value (B_value) and the length (B_duration) of one of the second section as a two-dimensional (2D) vector area. According to at least some example embodiments, predefined warping rules may be present with respect to the cost matrix 600 for DNM.

According to a first warping rule, a warping path may proceed in a direction that extends from a lower side and a left side to at least one of an upper side and a right side of the cost matrix 600. For example, if the cost matrix 600 includes a plurality of vector areas 610 according to a plurality of rows and a plurality of columns, the warping path may proceed in one of a vertical direction that extends upward, a horizontal direction that extends right, and a diagonal direction that extends between an upper side and a right side in one of the vector areas 610.

Figure 9A:
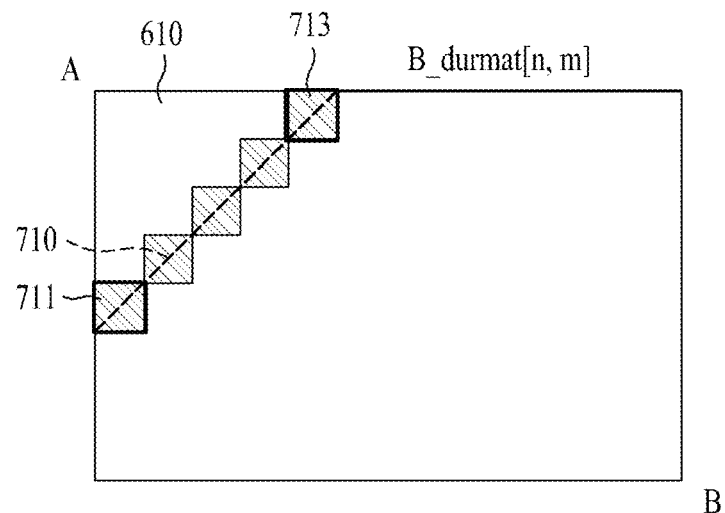
Figure 9B:
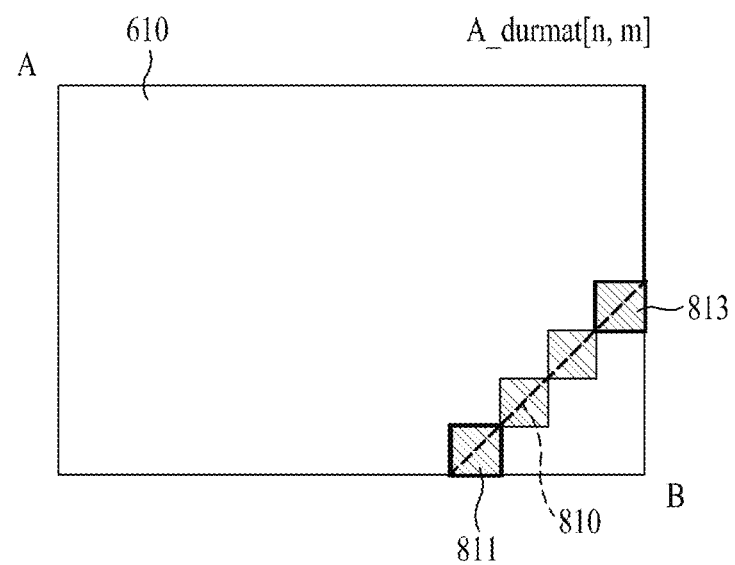
Figure 10:
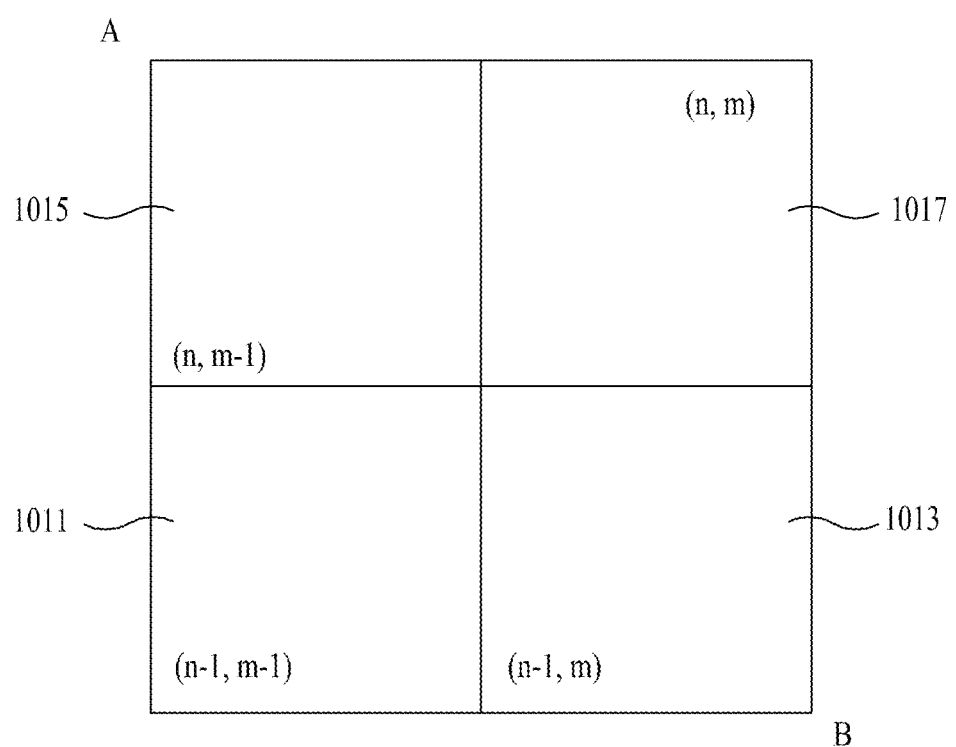

According to a second warping rule, the warping path may proceed in the diagonal direction that extends between the upper side and the right side in each vector area 610. Referring to FIGS. 7A, 7B, 8A and 8B, each vector area 610 may represent an array of elements according to a value (A_value) and a length (A_duration) of a single first section and a value (B_value) and a length (B_duration) of a single second duration. A cost may be assigned to each element in each vector area 610. Among elements of each vector area 610, start positions 711 and 811 and arrival positions 713 and 813 of warping paths 710 and 810 may be determined. Here, the arrival positions 713 and 813 of the warping paths 710 and 810 may be differently determined based on the start positions 711 and 811 of the warping paths 710 and 810. Each of the warping paths 710 and 810 may proceed to be in contact with at least one of the upper side and the right side of the vector area 610. For example, referring to FIG. 7B, the arrival position 713 of the warping path 710 may be in contact with the upper side of the vector area 610. In this case, as shown in FIG. 9A, with respect to the arrival position 713 of the vector area 610, a valid distance (A_durmat[n, m]) from the upper side may be 0 and a valid distance (B_durmat[n, m]) from the right side may be present. As another example, referring to FIG. 8B, the arrival position 813 of the warping path 810 may be in contact with the right side of the vector area 810. In this case, with respect to the arrival position 813 of the vector area 610, a valid distance (B_durmat[n, m]) from the right side may be 0 and a valid distance (A_durmat[n, m]) from the upper side may be present.

In operation 517, the server 130 may calculate a cost for each vector area 610 of the cost matrix 600. The processor 241 may calculate a cost for each vector area 610 based on the value (A_value) and the length (A_duration) of the first section and the value (B_value) and the length (B_duration) of the second section as represented by the following Equation 5. According to the second warping rule, Equation 5 may be modified to the following Equation 6.

$$\text{cost}[n,m]=|A\_\text{value}[n]-B\_\text{value}[m]|\cdot\min(A\_\text{duration}[n],B\_\text{duration}[m]) \quad \text{[Equation 5]}$$

$$\text{cost}[n,m]=|A\_\text{value}[n]-B\_\text{value}[m]|\cdot\min(\text{valid distance}), \text{valid distance}\neq 0 \quad \text{[Equation 6]}$$

The processor 241 may calculate a cost for the vector area 610 corresponding to a lowermost row and a leftmost column of the cost matrix 600. For example, referring to FIG. 10, with respect to the cost matrix 600, the processor 241 may calculate a cost for each vector area 610 (1011, 1013, 1015) corresponding to the lowermost row and the leftmost column of the cost matrix 600. Here, the processor 241 may calculate the cost for each vector area 610 (1011, 1013, 1015) based on the second warping rule. In detail, the processor 241 may calculate a cost for a case in which the warping path arrives at the upper side of the vector area 610 (1011, 1013, 1015) and a case in which the warping path arrives at the right side of the vector area 610 (1011, 1013, 1015).

If the cost matrix 600 includes a plurality of rows and a plurality of columns, the processor 241 may calculate a cost of a target vector area, for example, the vector area 610 (1017) of which cost is to be calculated among the plurality of vector areas 610. Here, the processor 241 may calculate the cost of the target vector area 1017 based on reference vector areas 1011, 1013, and 1015 of which costs are calculated among the vector area 610. For example, referring to FIGS. 11, 12, and 13, the processor 241 may calculate candidate costs of the target vector area 1017 from each of the reference vector areas 1011, 1013, and 1015. The processor 241 may select a relatively low or, alternatively, minimum candidate cost from among the candidate costs as the cost of the target vector area 1017.

To this end, the processor 241 may select the reference vector areas 1011, 1013, and 1015 corresponding to a lower row and a left column of the target vector area 1017. Here, the reference vector areas 1011, 1013, and 1015 may include the first reference vector area 1011, the second reference vector area 1013, and the third reference vector area 1015. The first reference vector area 1011 may be the vector area 610 that is provided below and to the left of, that is, in a diagonal direction of the target vector area 1017, the second reference vector area 1013 may be the vector area 610 that is provided below the target vector area 1017, and the third reference vector area 1015 may be the vector area 610 that is provided to the left of the target vector area 1017.

Figure 11:
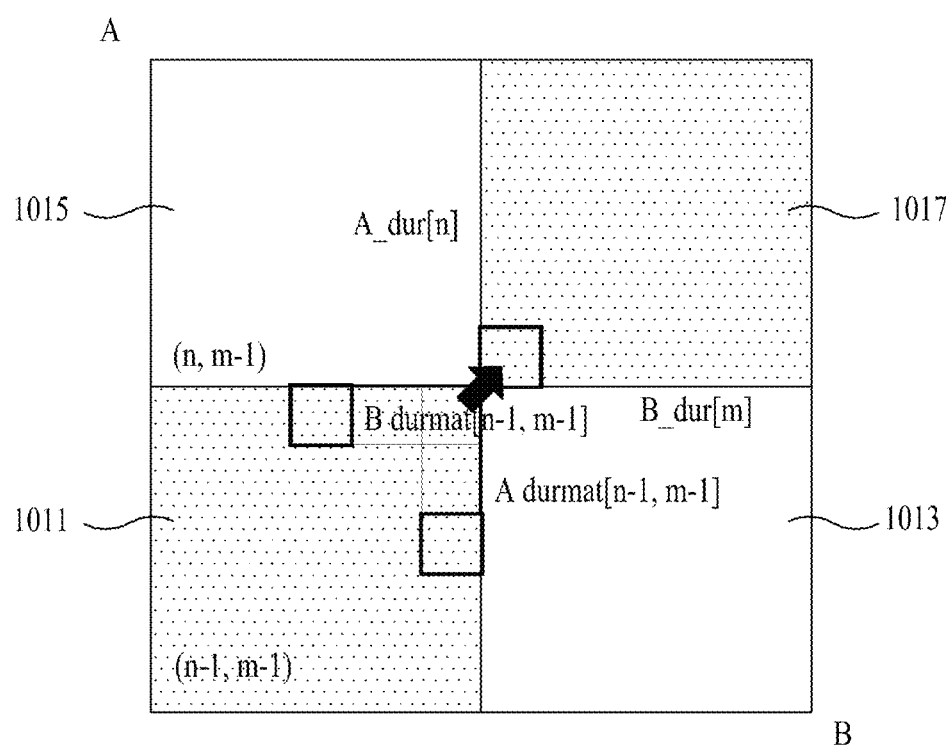

Referring to FIG. 11, the processor 241 may calculate candidate costs of the target vector area 1017 from the first reference vector area 1011. Here, the processor 241 may calculate a candidate cost for a case in which the warping path arrives at the upper side in the first reference vector area 1011 as represented by the following Equation 7. The processor 241 may calculate a candidate cost for a case in which the warping path arrives at the right side in the first reference vector area 1011 as represented by the following Equation 8.

$$\text{cost\_candidate}[0] = \text{costArr}[n-1,m-1] + \text{distance}$$
$$[n,m] \cdot \min(A\_\text{duration}[n], B\text{duration}[m]) + \text{distance}$$
$$[n-1,m-1] \cdot B\_\text{durmat}[n-1,m-1],$$

$$\text{distance}[n,m] = |A\_\text{value}[n] - B\_\text{value}[m]|,$$

$$\text{distance}[n-1,m-1] = |A\_\text{value}[n-1] - B\_\text{value}[m-1]| \quad \text{[Equation 7]}$$

$$\text{cost\_candidate}[0] = \text{costArr}[n-1,m-1] + \text{distance}$$
$$[n,m] \cdot \min(A\_\text{duration}[n], B\_\text{duration}[m]) + \text{distance}[n-1,m-1] \cdot A\_\text{durmat}[n-1,m-1] \quad \text{[Equation 8]}$$

Figure 12:
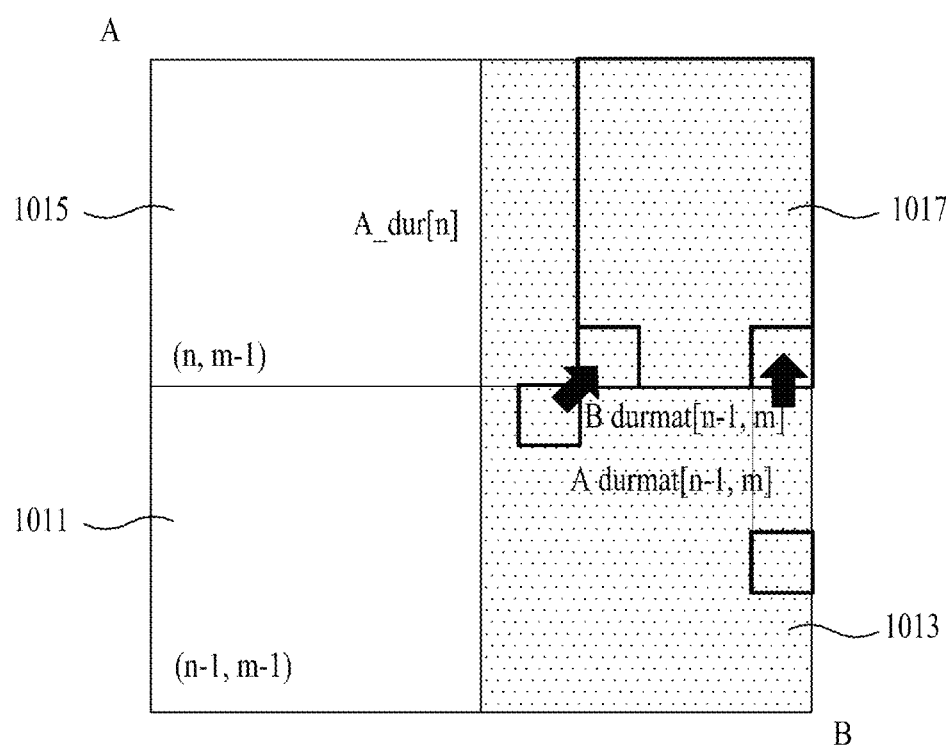

Referring to FIG. 12, the processor 241 may calculate candidate costs of the target vector area 1017 from the second reference vector area 1013. Here, the processor 241 may calculate a candidate cost for a case in which the warping path arrives at the upper side in the second reference vector area 1013 as represented by the following Equation 9. The processor 241 may calculate a candidate cost for a case in which the warping path arrives at the right side in the second reference vector area 1013 as represented by the following Equation 10.

$$\text{cost\_candidate}[1] = \text{costArr}[n-1,m] + \text{distance}[n,m] \cdot \min$$
$$(A\_\text{duration}[n], B\_\text{durmat}[n-1,m] \quad \text{[Equation 9]}$$

$$\text{cost\_candidate}[1] = \text{costArr}[n-1,m] + \text{distance}$$
$$[n,m] \cdot A\_\text{duration}[n] + \text{distance}[n-1,m] \cdot A\_\text{durmat}[n-1,m]$$

$$\text{distance}[n-1,m] = |A\_\text{value}[n-1] - B\_\text{value}[m]| \quad \text{[Equation 10]}$$

Figure 13:
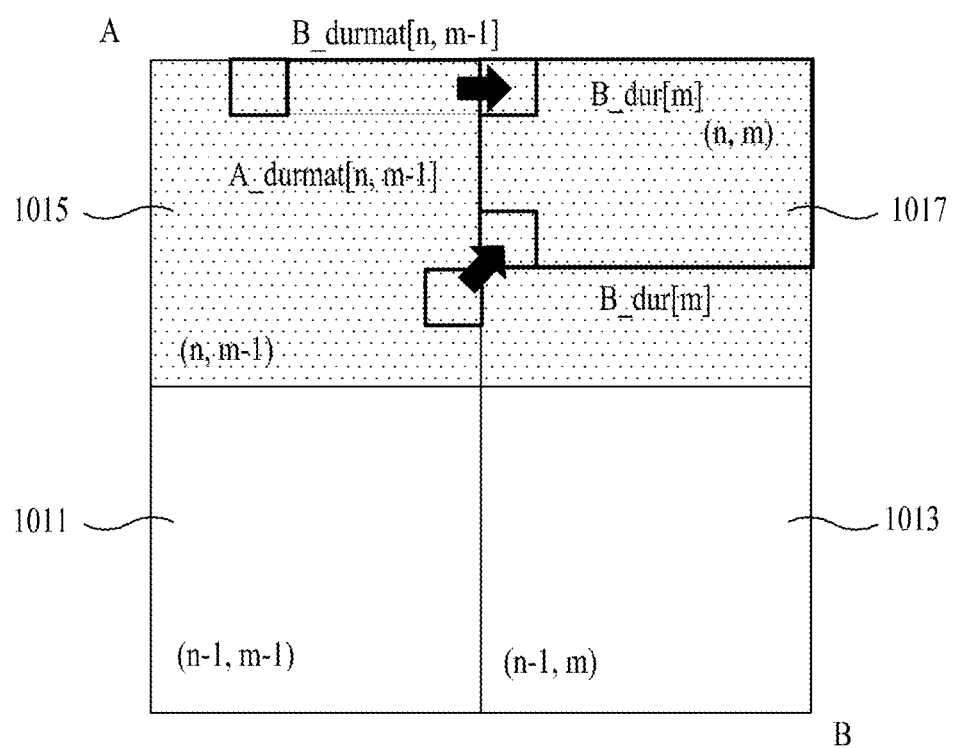

Referring to FIG. 13, the processor 241 may calculate candidate costs of the target vector area 1017 from the third reference vector area 1015. Here, the processor 241 may calculate a candidate cost for a case in which the warping path arrives at the upper side in the third reference vector area 1015 as represented by the following Equation 11. The processor 241 may calculate a candidate cost for a case in which the warping path arrives at the right side in the third reference vector area 1015 as represented by the following Equation 12.

$$\text{cost\_candidate}[2] = \text{costArr}[n,m-1] + \text{distance}$$
$$[n,m] \cdot B\_\text{duration}[,] + \text{distance}[n,m-1] \cdot B\_\text{durmat}[n,m-1],$$

$$\text{distance}[n,m-1] = |A\_\text{value}[n] - B\_\text{value}[m-1]| \quad \text{[Equation 11]}$$

$$\text{cost\_candidate}[2] = \text{costArr}[n,m-1] + \text{distance}[n,m] \cdot \min$$
$$(A\_\text{durmat}[n,m-1], B\_\text{duration}[m]) \quad \text{[Equation 12]}$$

In operation 519, the server 130 may detect the warping path from the cost matrix 600. The processor 241 may detect a desirable or, alternatively, optimal warping path from the cost matrix 600 by considering costs of all of the vector areas 610 of the cost matrix 600.

In operation 521, the server 130 may calculate a similarity between the first section sequence A and the second section sequence B based on the warping path. The processor 241 may analyze the warping path of the cost matrix 600 and may calculate the similarity between the first section sequence A and the second section sequence B. The server 130 may return to operation 417 of FIG. 4.

Referring again to FIG. 4, in operation 417, the server 130 may generate feedback information that includes at least one of the second sequences s. The processor 241 may select at least one second sequence s from among the second sequences s based on the similarities between the first sequence q and the second sequences s. For example, the processor 241 may detect a relatively high or, alternatively maximum similarity from among the similarities and may select the second sequence s corresponding to the detected relatively high or, alternatively maximum similarity. As another example, the processor 241 may detect at least one similarity exceeding a predetermined (or, alternatively, desired) threshold from among the similarities and may select the second sequence s corresponding thereto. The processor 241 may generate feedback information that include meta information about an audio file associated with at least one of the second sequences s.

In operation 419, the server 130 may transmit the feedback information to the external apparatus, for example, the client 110. The processor 241 may transmit the feedback information to the client 110 through the communication module 237.

Figure 14:
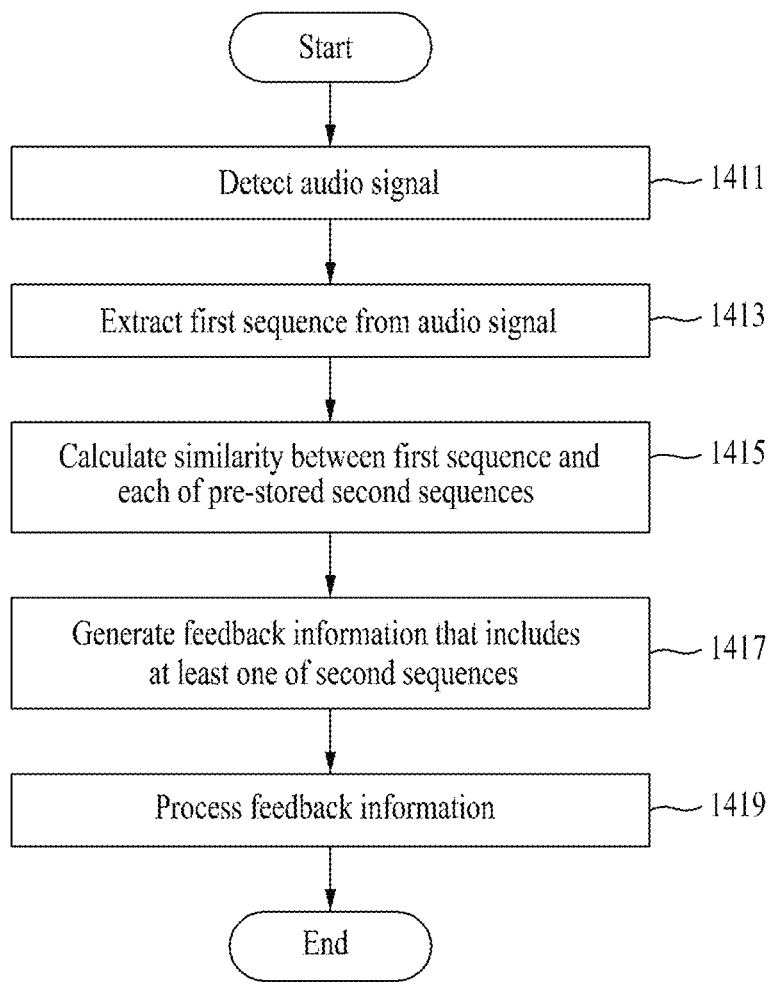
FIG. 14 is a flowchart illustrating an example of an operating method of an electronic apparatus according to at least one example embodiment.

FIG. 14 is a flowchart illustrating an example of an operating method of an electronic apparatus, for example, the client 110 or the server 130, according to at least one example embodiment.

Referring to FIG. 14, in operation 1411, the electronic apparatus, for example, the client 110 or the server 130, may detect an audio signal. The processor 221, 241 may collect an audio signal during a specific time interval in response to a request from a user. The audio signal may be related to a melody the user desires to retrieve. For example, the audio signal may include at least one of voice of the user and music being played back in an external environment. In operation 1413, the electronic apparatus may extract a first sequence q from the audio signal. For example, the processor 221, 241 may extract the first sequence q from the audio signal. Through this, in operation 1415, the electronic apparatus may calculate a similarity between the first sequence q and each of the pre-stored second sequences s. The processor 221, 241 may calculate the similarity between the first sequence q and each of the pre-stored second sequences s through DNM. Here, for example, the memory 219, 239 may store the second sequences s of audio files with at least one of the audio files and meta information about the audio files.

In operation 1417, the electronic apparatus, for example, the client 110 or the server 130, may generate feedback information that includes at least one of the second sequences s. For example, the processor 221, 231 may generate the feedback information. In operation 1419, the electronic apparatus may process the feedback information. For example, the processor 221, 231 may output the feedback information. As another example, the processor 221, 231 may transmit the feedback information to another electronic apparatus (not shown).

According to at least some example embodiments, an electronic apparatus, for example, the client 110 or the server 130, may reduce each of an input signal and pre-stored data and may compare the reduced input signal and pre-stored data, which may lead to reducing a computational amount required for the electronic apparatus. Here, the electronic apparatus may generate the cost matrix 600 based on the first section sequence A reduced from the input signal and the second section sequence B reduced from the pre-stored data, and may detect a warping path from the cost matrix 600 through DNM. Through this, the electronic apparatus may use dynamic programming based on information reduced from each of the input signal and the pre-stored data. Accordingly, the electronic apparatus may acquire a desired result with the reduced computational amount. Also, it is possible to improve the operational efficiency of the electronic apparatus and a quality of service (QoS) provided through the electronic apparatus.

According to at least some example embodiments, an operating method of an electronic apparatus, for example, the client 110 or the server 130, for DNM may include acquiring the first section sequence A by reducing the first sequence q extracted from the input signal based on at least one first section in which the respective values are successively arranged, acquiring the second section sequence B reduced from the pre-stored second sequence s based on at least one second section in which the respective values are successively arranged, and calculating a similarity between the first section sequence A and the second section sequence B.

According to at least some example embodiments, the first section sequence A may represent a sequence for a value and a length of the first section, and the second section sequence B may represent a sequence for a value and a length of the second section.

According to at least some example embodiments, the calculating of the similarity of the cost may include generating the cost matrix 600 including at least one vector area 610 based on the first section sequence A and the second section sequence B, calculating a cost for the vector area 610, detecting a warping path from the cost matrix 600 based on the cost, and calculating the similarity using the warping path.

According to at least some example embodiments, the generating of the cost matrix may include generating at least one row of the cost matrix 600 corresponding to the first section and generating at least one column of the cost matrix 600 corresponding to the second section.

Here, each vector area 610 may be generated by a single first section and a single second section.

According to at least some example embodiments, the calculating of the cost may include calculating a cost for the vector area 610 corresponding to a lowermost row and a leftmost column of the cost matrix 600 based on a value and a length of the first section and a value and a length of the second section, selecting the reference vector areas 1011, 1013, and 1015 corresponding to a lower row and a left column of the target vector area 1017 if the cost matrix 600 includes a plurality of rows and a plurality of columns, and calculating a cost of the target vector area 1017 based on costs of the reference vector areas 1011, 1013, and 1015.

According to at least some example embodiments, the calculating of the cost of the target vector area 1017 may include calculating candidate costs of the target vector area 1017 from each of the reference vector areas 1011, 1013, and 1015, and selecting a relatively low or, alternatively, minimum candidate cost from among the candidate costs as the cost of the target vector area 1017.

According to at least some example embodiments, the calculating of candidate costs may include calculating one of the candidate costs based on a cost corresponding to an upper side in one of the reference vector areas 1011, 1013, and 1015, and calculating another one of the candidate costs based on a cost corresponding to a right side in one of the reference vector areas 1011, 1013, and 1015.

According to at least some example embodiments, the acquiring of the first section sequence A may include receiving an audio signal from an external apparatus, extracting the first sequence q from the audio signal, and acquiring the first section sequence A by reducing the first sequence q.

According to at least some example embodiments, the acquiring of the second section sequence B and calculating the similarity may be individually performed with respect to a plurality of per-stored second sequences.

According to at least some example embodiments, the operating method of the electronic apparatus may further include selecting at least one second sequence from among the second sequences s based on the similarity, and feeding back meta information associated with the selected second sequence s to the external apparatus.

According to at least some example embodiments, the electronic apparatus, for example, the client 110 or the server 130, for DNM may include the processor 221, 241 configured to extract the first sequence q from an input signal and the memory 219, 239 configured to connect to the processor 221, 241 and to store at least one second sequence s.

According to at least some example embodiments, the processor 221, 241 may be configured to acquire the first section sequence A by reducing the first sequence q based on at least one first section in which the respective values are successively arranged, to acquire the second section sequence B reduced from the second sequence s based on at least one second section in which the respective values are successively arranged, and to calculate the similarity between the first section sequence A and the second section sequence B.

According to at least some example embodiments, the first section sequence A may represent a sequence for a value and a length of the first section, and the second section sequence B may represent a sequence for a value and a length of the second section.

According to at least some example embodiments, the processor 221, 241 may be configured to generate the cost matrix 600 including at least one vector area 610 based on the first section sequence A and the second section sequence B, to calculate a cost for the vector area 610, to detect a warping path from the cost matrix 600 based on the cost, and to calculate the similarity using the warping path.

According to at least some example embodiments, the processor 221, 241 may be configured to generate at least one row of the cost matrix 600 corresponding to the first section and to generate at least one column of the cost matrix 600 corresponding to the second section. Here, each vector area 610 may be generated by a single first section and a single second section.

According to at least some example embodiments, the processor 221, 241 may be configured to calculate a cost for the vector area 610 corresponding to a lowermost row and a leftmost column of the cost matrix 600 based on a value and a length of the first section and a value and a length of the second section, to select the reference vector areas 1011, 1013, and 1015 corresponding to a lower row and a left column of the target vector area 1017 if the cost matrix 600 includes a plurality of rows and a plurality of columns, and to calculate a cost of the target vector area 1017 based on costs of the reference vector areas 1011, 1013, and 1015.

According to at least some example embodiments, the processor 221, 241 may be configured to calculate candidate costs of the target vector area 1017 from each of the reference vector areas 1011, 1013, and 1015, and to select a relatively low or, alternatively, minimum candidate cost from among the candidate costs as the cost of the target vector area 1017.

According to at least some example embodiments, the processor 221, 241 may be configured to calculate one of the candidate costs based on a cost corresponding to an upper side in one of the reference vector areas 1011, 1013, and 1015, and to calculate another one of the candidate costs based on a cost corresponding to a right side in one of the reference vector areas 1011, 1013, and 1015.

According to at least some example embodiments, the processor 221, 241 may be configured to receive an audio signal from an external apparatus, for example, the client 110, to extract the first sequence q from the audio signal, and to acquire the first section sequence A by reducing the first sequence q.

According to at least some example embodiments, the processor 221, 241 may be configured to calculate similarities corresponding to a plurality of pre-stored second sequences s, to select at least one second sequence s from among the second sequences s based on the similarities, and to feed back meta information associated with the selected second sequence s to the external apparatus.

The example embodiments may be implemented as software including at least one instruction stored in a storage medium (e.g., the memory 219, 239) readable by a machine (an electronic apparatus, e.g., the client 110 or the server 130). For example, a processor (e.g., the processor 221, 241) of the machine may call at least one instruction among instructions stored in the storage medium and may execute the called at least one instruction. Accordingly, the machine may perform at least one function in response to the called at least one instruction. The at least one instruction may include a code generated by a compiler or a code executable by an interpreter. The storage medium readable by the machine may be provided in a form of a non-transitory storage medium. Here, the term "non-transitory" may indicate that the storage medium is tangible and does not include a signal (e.g., an electromagnetic wave). The term does not distinguish a case in which data is semi-permanently stored in the storage medium from a case in which data is transitorily stored in the storage medium.

A non-transitory computer-readable storage medium according to example embodiments may store at least one program to perform acquiring the first section sequence A by reducing the first sequence q extracted from the input signal based on at least one first section in which the respective values are successively arranged, acquiring the second section sequence B reduced from the pre-stored second sequence s based on at least one second section in which the respective values are arranged, and calculating a similarity between the first section sequence A and the second section sequence B.

The terms used herein are used to explain specific example embodiments and are not construed to limit the disclosure and should be understood to include various modifications, equivalents, and/or substitutions of the example embodiments. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic," "logic block," "part," "circuit," etc. The module may be an integrally configured part, a minimum unit that performs at least function, or a portion thereof. For example, the module may be configured as an application-specific integrated circuit (ASIC).

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in sequential, parallel, iterative, or heuristic manner. Alternatively, at least one of the operations may be performed in different sequence or omitted. Alternatively, at least one another operation may be added.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An operating method of an electronic apparatus including a processor, the method comprising:
    extracting, by the processor, a first sequence of number vectors from a real audio input signal;
    acquiring, by the processor, a first section sequence by reducing the first sequence of values based on at least one first section of the first sequence in which respective values of the first sequence are successively arranged, the first section sequence representing a sequence for a value and a length of the at least one first section;
    acquiring, by the processor, a second section sequence reduced from a pre-stored second sequence of values including number vectors extracted from one of audio files based on at least one second section of the second sequence in which respective values of the second sequence are successively arranged, the second section sequence representing a sequence for a value and a length of the at least one second section;
    calculating, by the processor, a similarity between the first section sequence and the second section sequence; and
    generating and transmitting, by the processor, feedback information corresponding to the audio input signal and including the second sequence in response to the calculated similarity exceeding a threshold similarity value.

2. The method of claim 1, wherein the calculating of the similarity comprises:
    generating a cost matrix including at least one vector area based on the first section sequence and the second section sequence;
    calculating a cost for the vector area;
    detecting a warping path from the cost matrix based on the cost; and
    calculating the similarity using the warping path.

3. The method of claim 2, wherein the generating of the cost matrix comprises:
    generating at least one row of the cost matrix corresponding to the first section; and
    generating at least one column of the cost matrix corresponding to the second section, and
    wherein each vector area is generated by a single first section and a single second section.

4. The method of claim 3, wherein the calculating of the cost comprises:
    calculating a cost for a vector area corresponding to a lowermost row and a leftmost column of the cost matrix based on a value and a length of the first section and a value and a length of the second section;
    selecting reference vector areas corresponding to a lower row and a left column of a target vector area if the cost matrix includes a plurality of rows and a plurality of columns; and
    calculating a cost of the target vector area based on costs of the reference vector areas.

5. The method of claim 4, wherein the calculating of the cost of the target vector area comprises:
    calculating candidate costs of the target vector area from each of the reference vector areas; and
    selecting a minimum candidate cost from among the candidate costs as the cost of the target vector area.

6. The method of claim 5, wherein the calculating of the candidate costs comprises:
    calculating one of the candidate costs based on a cost corresponding to an upper side in one of the reference vector areas; and
    calculating another one of the candidate costs based on a cost corresponding to a right side in one of the reference vector areas.

7. The method of claim 1, wherein the acquiring of the first section sequence comprises:
    receiving an audio signal from an external apparatus;
    extracting the first sequence from the audio signal; and
    acquiring the first section sequence by reducing the first sequence.

8. The method of claim 7, wherein the acquiring of the second section sequence and the calculating of the similarity are individually performed with respect to a plurality of pre-stored second sequences.

9. The method of claim 8, further comprising:
    selecting at least one second sequence from among the second sequences based on the similarity; and
    feeding back meta information associated with the selected second sequence to the external apparatus.

10. An electronic apparatus comprising:
processing circuitry configured to extract a first sequence of values from an input signal; and
a memory configured to connect to the processing circuitry and to store at least one second sequence of values,
wherein the processing circuitry is configured to,
extract a first sequence of number vectors from a real audio input signal,
acquire a first section sequence by reducing the first sequence of values based on at least one first section of the first sequence in which respectively values of the first sequence are successively arranged, the first section sequence representing a sequence for a value and a length of the at least one first section,
acquire a second section sequence reduced from the at least one stored second sequence of values including number vectors extracted from one of audio files based on at least one second section of the second sequence in which respective values of the second sequence are successively arranged, the second section sequence representing a sequence for a value and a length of the at least one second section,
calculate a similarity between the first section sequence and the second section sequence, and
generate and transmit feedback information corresponding to the audio input signal and including the second sequence in response to the calculated similarity exceeding a threshold similarity value.

11. The electronic apparatus of claim 10, wherein the processing circuitry is further configured to:
generate a cost matrix comprising at least one vector area based on the first section sequence and the second section sequence,
calculate a cost for the vector area,
detect a warping path from the cost matrix based on the cost, and
calculate the similarity using the warping path.

12. The electronic apparatus of claim 11, wherein the processing circuitry is further configured to:
generate at least one row of the cost matrix corresponding to the first section, and
generate at least one column of the cost matrix corresponding to the second section, and
wherein each vector area is generated by a single first section and a single second section.

13. The electronic apparatus of claim 12, wherein the processing circuitry is further configured to:
calculate a cost for a vector area corresponding to a lowermost row and a leftmost column of the cost matrix based on a value and a length of the first section and a value and a length of the second section,
select reference vector areas corresponding to a lower row and a left column of a target vector area if the cost matrix includes a plurality of rows and a plurality of columns, and
calculate a cost of the target vector area based on costs of the reference vector areas.

14. The electronic apparatus of claim 13, wherein the processing circuitry is further configured to:
calculate candidate costs of the target vector area from each of the reference vector areas, and
select a minimum candidate cost from among the candidate costs as the cost of the target vector area.

15. The electronic apparatus of claim 14, wherein the processing circuitry is further configured to:
calculate one of the candidate costs based on a cost corresponding to an upper side in one of the reference vector areas, and
calculate another one of the candidate costs based on a cost corresponding to a right side in one of the reference vector areas.

16. The electronic apparatus of claim 10, wherein the processing circuitry is further configured to:
receive an audio signal from an external apparatus,
extracting the first sequence from the audio signal, and
acquire the first section sequence by reducing the first sequence.

17. The electronic apparatus of claim 16, wherein the processing circuitry is further configured to:
calculate a plurality of similarities corresponding to a plurality of pre-stored second sequences,
select at least one second sequence from among the second sequences based on the similarities, and
feed back meta information associated with the selected second sequence to the external apparatus.

18. A non-transitory computer-readable storage medium storing instructions that, when executed by a processor, cause the processor to perform operations for operating an electronic apparatus, the operations including:
extracting, by the processor, a first sequence of number vectors from a real audio input signal;
acquiring, by the processor, a first section sequence by reducing the first sequence of values based on at least one first section of the first sequence in which respective values of the first sequence are successively arranged, the first section sequence representing a sequence for a value and a length of the at least one first section;
acquiring, by the processor, a second section sequence reduced from a pre-stored second sequence of values including number vectors extracted from one of audio files based on at least one second section of the second sequence in which respective values of the second sequence are successively arranged, the second section sequence representing a sequence for a value and a length of the at least one second section;
calculating, by the processor, a similarity between the first section sequence and the second section sequence, and
generating and transmitting, by the processor, feedback information corresponding to the audio input signal and including the second sequence in response to the calculated similarity exceeding a threshold similarity value.

* * * * *